Oct. 18, 1966 C. O. CARLSON 3,279,095

INFORMATION ENCODING AND DECODING METHOD

Filed Oct. 24, 1961 7 Sheets-Sheet 1

CARL O. CARLSON
INVENTOR

BY

ATTORNEYS

CARL O. CARLSON
INVENTOR

BY

ATTORNEYS

CARL O. CARLSON
INVENTOR

BY Louis A. Kline
John T. Matlago
Mervyn L. Young
ATTORNEYS

CARL O. CARLSON
INVENTOR

BY Louis A. Kline
John T. Matlago
Mervyn L. Young
ATTORNEYS

Oct. 18, 1966 C. O. CARLSON 3,279,095

INFORMATION ENCODING AND DECODING METHOD

Filed Oct. 24, 1961 7 Sheets-Sheet 5

CARL O. CARLSON
INVENTOR.

Louis A Kline
BY John J. Matlago
Menzer L. Young
ATTORNEYS

CARL O. CARLSON
INVENTOR.

BY Louis A. Kline
John J. Matlago
Morgan L. Young
ATTORNEYS

INFORMATION ENCODING AND DECODING METHOD

Filed Oct. 24, 1961

7 Sheets-Sheet 7

CARL O. CARLSON
INVENTOR.

BY Louis A. Kline
John J. Matlago
Mervyn L. Young
ATTORNEYS

United States Patent Office 3,279,095
Patented Oct. 18, 1966

3,279,095
INFORMATION ENCODING AND DECODING METHOD

Carl O. Carlson, Los Angeles, Calif., assignor to The National Cash Register Company, Dayton, Ohio, a corporation of Maryland Filed Oct. 24, 1961, Ser. No. 147,360
10 Claims. (Cl. 35—2)

This invention relates to cryptographic scrambling and unscrambling methods and apparatus and more particularly to an improved and unique means for concealing and encoding information, in various forms, in a randomly distributed background pattern.

In many financial and business fields, clients or customers are required to be identified by their signature, copies of which are maintained on signature cards at the various branches of the particular enterprise for comparison. In many such fields, in order to save time for the clerk or teller, the customer or client presents his own signature card, such as maintained in a passbook, or other means of identification. For example, when a customer is making a purchase on credit or is cashing a check, it is normal practice to require him to present some means of identification bearing his signature for comparison with the bill or the check he has signed. However, a serious problem exists in regard to such business arrangements in that should the customer's signature card be lost or stolen, the recipient thereof may easily learn how to forge the signature of that customer so as to be able to present himself in the customer's place. A solution to this problem has been to conceal or disguise the customer's signature on a signature card in such a manner that the signature card can be read, presumably, only by the clerk or teller to whom the card is to be presented.

Commercially available scrambling apparatus, for practical purposes, are relatively crude such that with little effort, one can detect the structure of the scrambled image of the signature, or other information, or the structure of the background pattern in which such information is concealed. While such scrambling means serve the purpose of hindering attempts to decode the scrambled information, such means are not foolproof and there is a need for methods and apparatus for improved encoding or scrambling of signatures and other information of a confidential nature which might be encountered in various business enterprises, which methods and apparatus are, nevertheless, economically feasible for wide scale application in standard commercial and business relations.

It is a major object of the present invention to provide an improved and novel device and method for cryptographic encoding or scrambling of a variety of types of information.

It is still another object of the present invention to provide an improved system and apparatus for encoding or scrambling signatures or other information such as encountered in business and commercial relations.

A further specific object of the present invention is to provide a system and apparatus for encoding or scrambling written and recorded information such as required for signature cards, bank passbooks, and the like.

It is still a further specific object of the present invention to provide an improved method and device for encoding and scrambling written and recorded information which method and device are economically feasible for application on a wide scale by various business enterprises.

Decoding devices of the prior art which are adapted to encode or scramble written or printed information contain two disadvantageous characteristics which are overcome by the present invention. One of such characteristics is the detectable structure of the pattern of the encoding screen or of a corresponding pattern of the background into which the information is to be concealed. Such a structure is usually in the form of lines of various configurations which are readily apparent to the eye and the person attempting to decipher such scrambled images normally proceeds by denoting and suppressing or otherwise identifying such lines and combinations thereof until the information pattern begins to appear. This disadvantage is overcome in the present invention by the provision of a completely random background pattern and a completely random pattern for the encoding or viewing screen such as will be described more in detail. A second disadvantage of cryptographic devices in the prior art is that where information is added to a background pattern, such informational bits tend to "bunch" up so as to become apparent to one making a careful inspection of the pattern containing both the background pattern and the informational pattern. The present invention overcomes this disadvantage by an arrangement wherein informational bits are both added to the background and removed from the background so that the density of such bits remains relatively constant and of the same order of magnitude as that of the background itself.

While the systems and method employed in the present invention may be applied to various media for the transmission of information, the major features of the present invention are directed towards the graphical encoding of written or printed information and include the provision of a background pattern having a coarse random structure to which there has either been added or subtracted a second pattern of a fine random structure to conceal the encoded information. A fine random pattern is also employed as the pattern for the encoding or scrambling pattern which when superimposed over the background pattern, to which the information has been added, fills in the background pattern so as to bring out the information concealed therein. Since the present invention encompasses both the addition and subtraction of informational and non-informational patterns, a particular feature of the present invention includes the means and apparatus for building up a particular pattern and also erasing portions thereof.

In addition to the above objects and features, other objects, advantages, and features are demonstrated and explained in the following specification and claims taken in conjunction with the drawings wherein:

As employed in this disclosure, a term "grain" is used to designate an enclosed area having a random or arbitrary shape and being of such a size that the coarse structure of the contemplated background of the present invention can be easily made by a random distribution of a plurality of such grains. Furthermore, the term "bit" is employed to denote a similar enclosed area of a random or arbitrary shape the dimensions of which are of at least one order of magnitude smaller than the dimensions of the above described grains. Since the contemplated backround pattern of the present invention contains random distributions of both grains and bits and since the information to be encoded is also formed by such bits, the respective bits will be denoted as non-information bits and information bits respectively, depending upon whether they form a portion of the background or a portion of the encoded information. While the respective patterns of the present invention can be formed of various colors or shades of gray, the principles and features of the present invention will be described herein only in terms of "dark" and "light" areas. In this sense, the term "write" will be used to denote the forming of a dark area and the term "erase" will be used to denote the formation of a light area, or more specifically the removal of a dark area.

While various photographic techniques can be employed to build up a pattern of information and non-information bits wherein such bits are both written into and erased from the overall pattern, such techniques become quite involved and complex. Therefore, a preferred embodiment of the method employed in this invention involves the use of a photo-metachromatic or phototropic material formed of a distribution of light sensitive dyes which become opaque in response to excitation by light of specific frequencies within the electromagnetic spectrum, which opaque condition may be removed by exposure to light of different frequencies within the spectrum. Such photometachromatic materials may include, for example, elementary and complex spiropyrans and derivatives thereof such as disclosed by E. Berman, Patent No. 2,953,454.

Figure 10:
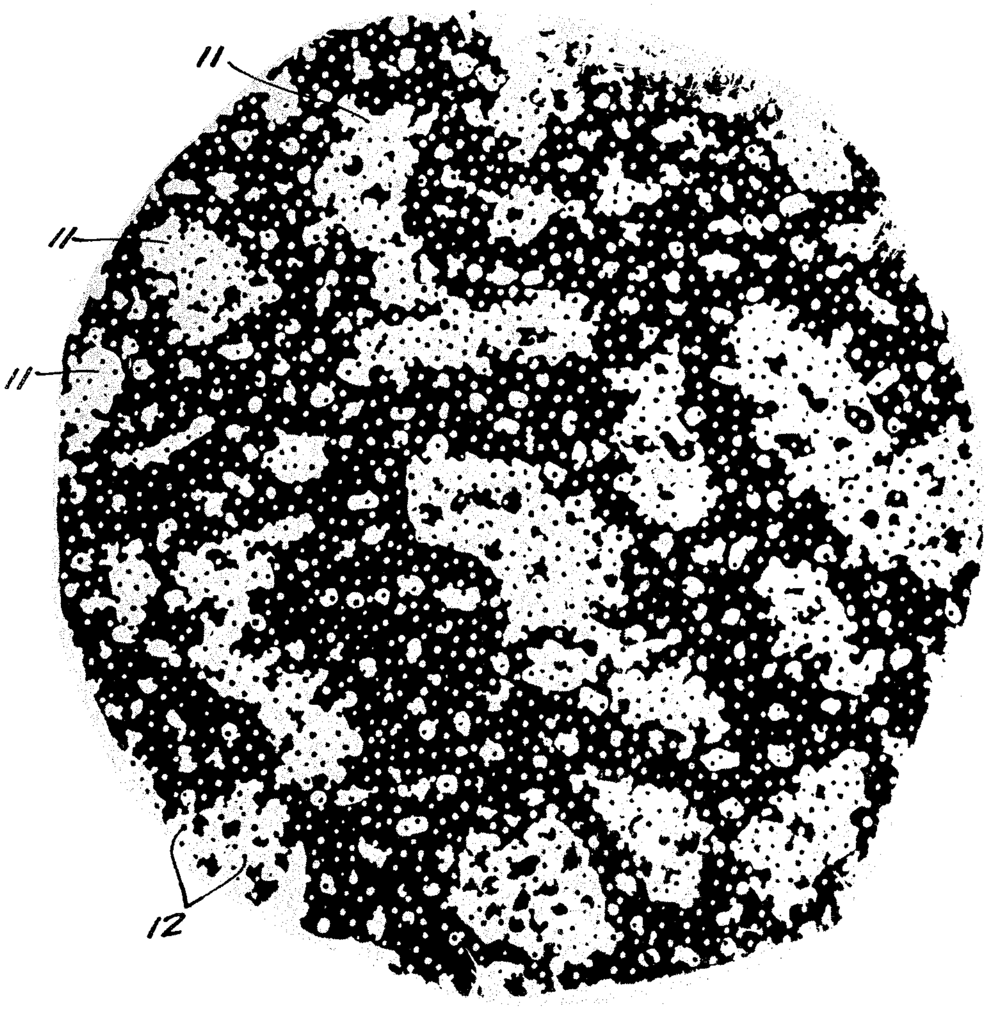
FIG. 10 is a reproduction of an enlarged portion of FIG. 1 corresponding to the region represented by FIG. 7.

In order to clearly explain and demonstrate the features of the present invention, reference will be made to FIG. 1 and to FIG. 10, FIG. 1 being a reproduction of the background pattern such as contemplated by the present invention and FIG. 10 being an enlarged portion thereof. As shown in FIG. 10, this pattern is composed of structure from which a random distribution of relatively large grains 11 has been removed and, within the individual large grain structures 11, there has been written in a pattern of randomly distributed fine bits 12, which pattern has also been erased from the areas in between the large grains.

Figure 2:
FIG. 2 is a reproduction of a fine random pattern such as employed in a typical encoding or scrambling screen for the present invention.
Figure 3:
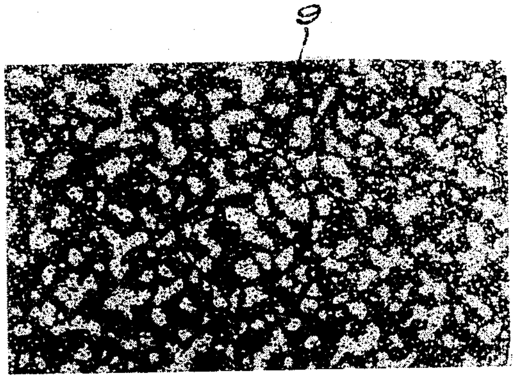
FIG. 3 is a reproduction of the background pattern of FIG. 1 to which has been added the fine structure of FIG. 2 except in those areas occupied by the information to be encoded.
Figure 4:
FIG. 4 is a reproduction of the pattern of FIG. 3 when viewed through an encoding or scrambling screen having the pattern of FIG. 2.

To insert informational bits into the background pattern just described, a code screen having a pattern such as shown in FIG. 2 is placed over the background pattern and this code pattern is erased or removed from the background pattern. The pattern of the code screen, as shown in FIG. 2, is made up of randomly distributed fine bits, of the order of magnitude of fine structure previously discussed in reference to FIG. 10, which bits have been removed from an otherwise opaque or dark background. While this code pattern is kept in registration with the background pattern, the signature or other information, which has been placed on a transparency or otherwise nonopaque medium such as onion skin and the like, is placed over the encoding screen and the pattern of the encoding screen is then written back into the background pattern except in those areas which are covered by the signature or other information. This results in a pattern of information and non-information bits which pattern is shown in FIG. 3. When this pattern is viewed through the code screen of FIG. 2 the result is as shown in FIG. 4 the pattern of which is a dark background from which a random distribution of fine bits have been erased in those areas representing the particular signature or information.

Figure 9:
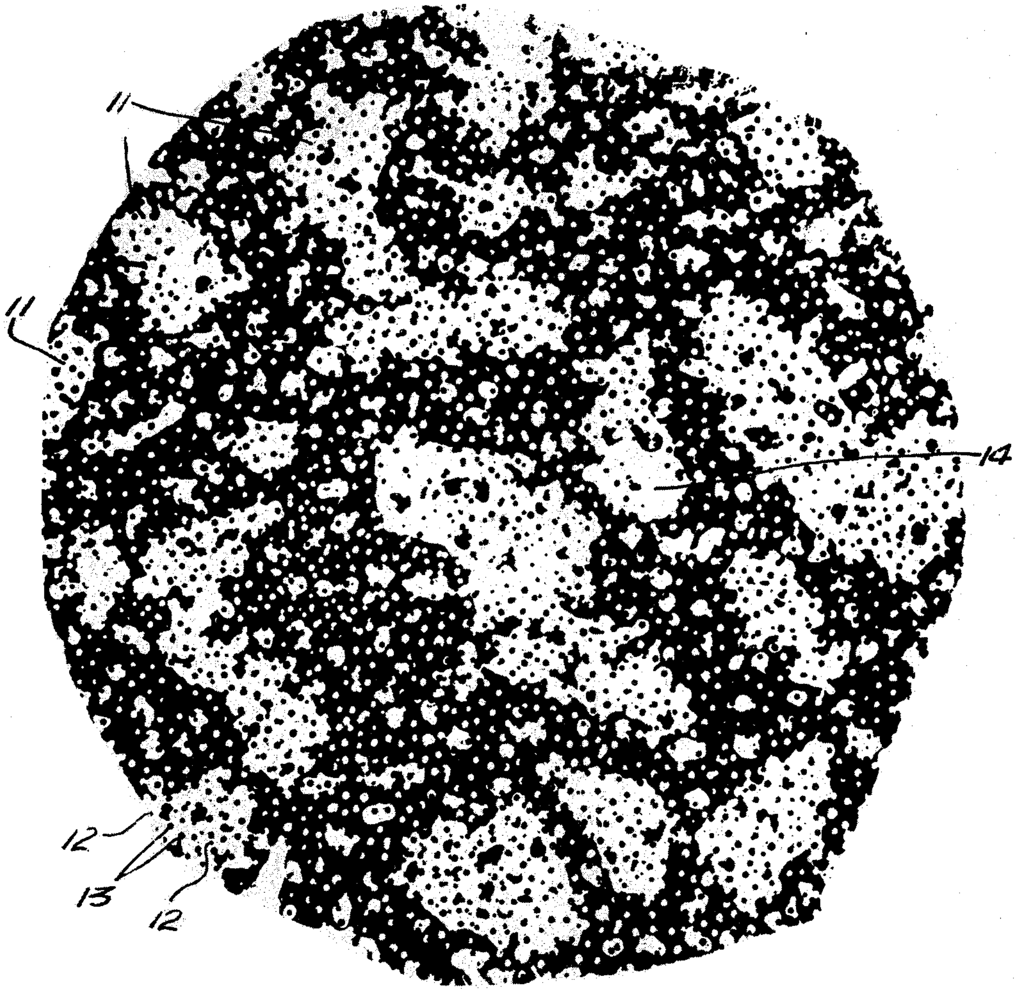
FIG. 9 is a reproduction of an enlarged portion of FIG. 3 corresponding to the region represented by FIG. 7.

To better understand the structure of the pattern of FIG. 3 reference is made to FIG. 9 which is an enlarged portion of FIG. 3 corresponding to the same region as shown in FIG. 10. Comparison of FIG. 9 and FIG. 10 discloses that the pattern of FIG. 9 contains additional fine bits 13 not contained in FIG. 10 which fine structure represents the pattern of the encoding screen of FIG. 2 except in those areas representing the information encoded therein such as indicated by numeral 14.

Figure 1:
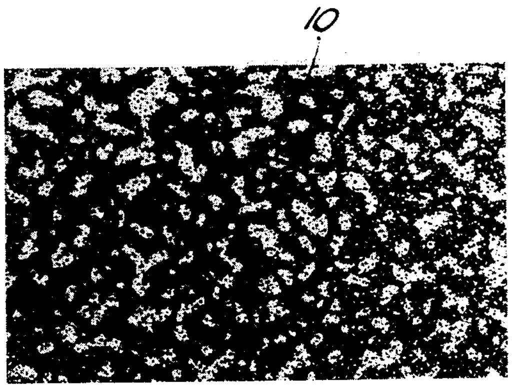
FIG. 1 is a reproduction of a typical background pattern as contemplated in the present invention.

If it is desired to have a dark signature on a light background, the steps in forming the encoded pattern are similar to that described above except that the code screen pattern is written into background pattern of FIG. 1 and while the code screen is kept in registration therewith, the signature is placed over the code screen and the code screen pattern is erased from the background pattern except in those areas representing the information or signature. The result thereof when viewed through the encoding screen will appear to be similar to the pattern shown in FIG. 6 although the actual pattern shown in FIG. 6 is obtained with additional steps that will be further explained.

While the encoded pattern of FIG. 3 conceals the information contained therein to a degree quite suitable for most commercial and business applications, a detailed examination of the pattern will at least indicate that there is information contained therein although it would be extremely difficult to determine the nature of that information because of the completely random distribution of the information and non-information bits. That is to say, by enlarging portions of the pattern of FIG. 3 such as illustrated in FIG. 9, information areas such as area 14 can be detected by examination of the pattern density of those areas and denoting the respective areas having a density sufficiently different from that of the surrounding background areas. Thus, to achieve relatively constant density throughout the pattern for both information and non-information bits, a code pattern different from but similar to that of FIG. 2 is employed to write in a fine structure where fine structure has otherwise been removed or, conversely, to remove or erase fine structure from the those areas wherein information fine structure has been written.

Figure 5:
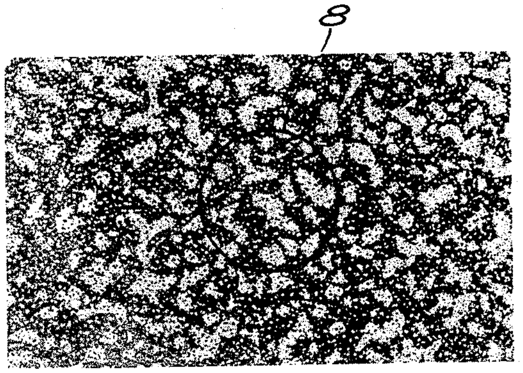
FIG. 5 is a reproduction of the pattern of FIG. 3 to which a fine random pattern different from but similar to the pattern of FIG. 2 has been added in the areas which are to contain the encoded information.
Figure 8:
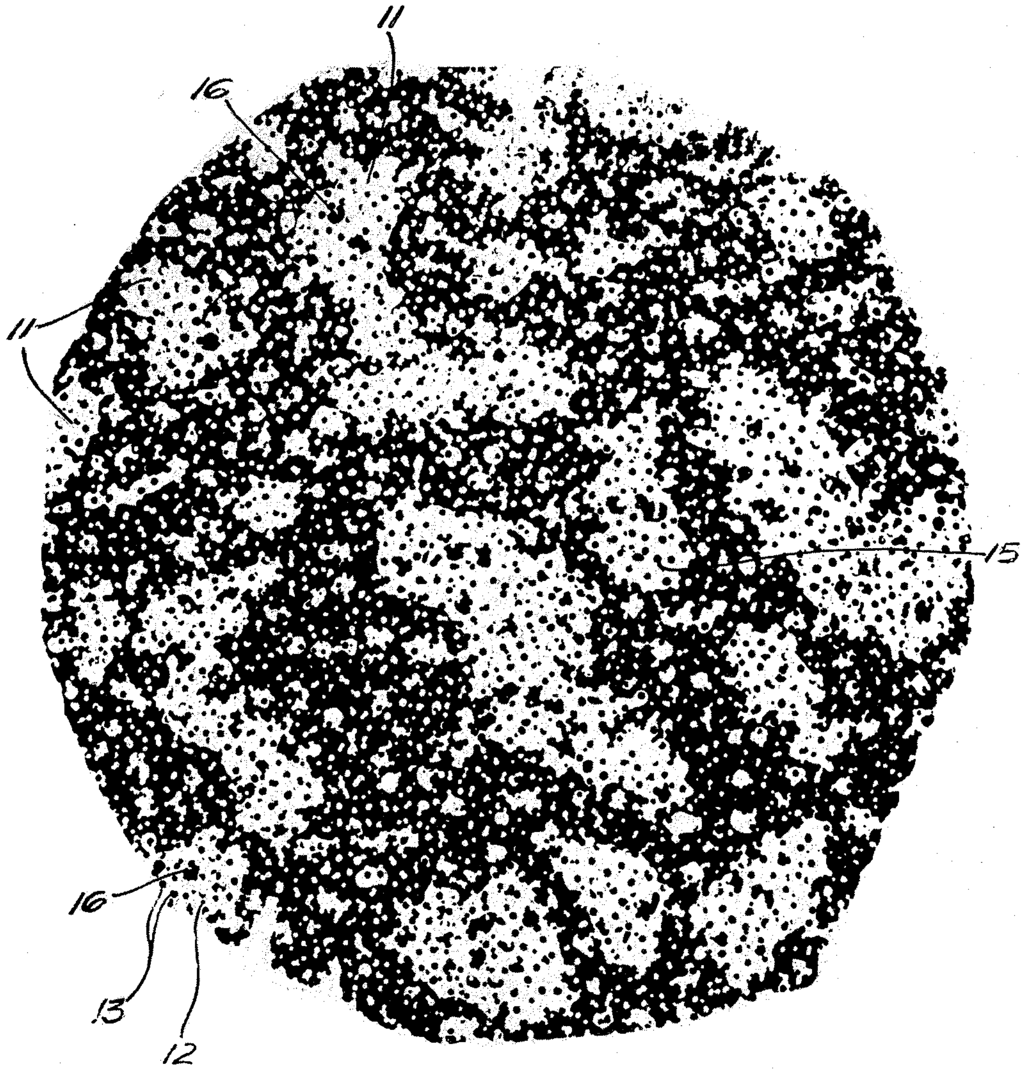
FIG. 8 is a reproduction of an enlarged portion of the pattern of FIG. 5 corresponding to the region represented by FIG. 7.

Composite patterns employing the above mentioned feature may be formed as in the manner for the pattern of FIG. 3 with additional steps being taken. For example, a pattern of FIG. 3 may be built up, as before described, by taking the background pattern of FIG. 1, erasing therefrom the fine structure of the coding screen of FIG. 2, placing the signature over the coding screen which is kept in registration with the altered background pattern, and writing in the fine structure of the first coding screen except in those areas representing the information. The coding screen of FIG. 2 is then replaced by a second coding screen having a fine structure similar to but different from that shown in FIG. 2. The pattern of the second coding screen is written into the composite pattern and the signature is placed over the coding screen in registration with the signature previously formed in the composite pattern while keeping the second coding screen in registration therewith. The fine structure pattern of the second coding screen is then erased from the composite pattern except in those areas representing the signature or other information. The end result will be a composite pattern as illustrated in FIG. 5 of which an enlarged portion is shown in FIG. 8 that corresponds to the similar regions represented by FIGS. 9 and 10. The pattern of FIG. 8 not only contains the same large grains 11, fine bits 12, and the non-informational bits 13 written in with the use of the first encoding screen, but also contains informational bits 15 in those areas 14 of FIG. 9 which represent the information encoded in the first sequence of steps of the operation. Further inspection of FIG. 8 will also indicate non-information bits 16 which have been erased from the background pattern during the second sequence of steps of the operation.

Figure 6:
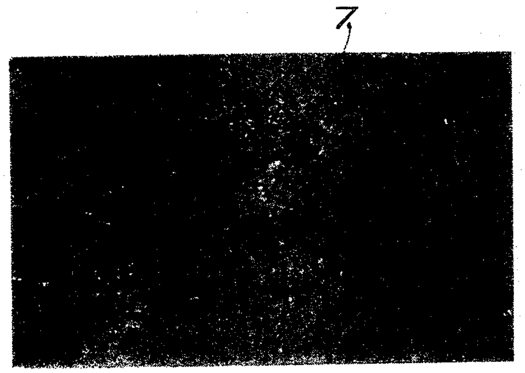
FIG. 6 is a reproduction of the pattern of FIG. 5 as viewed through a scrambling or encoding screen such as described in reference thereto.
Figure 7:
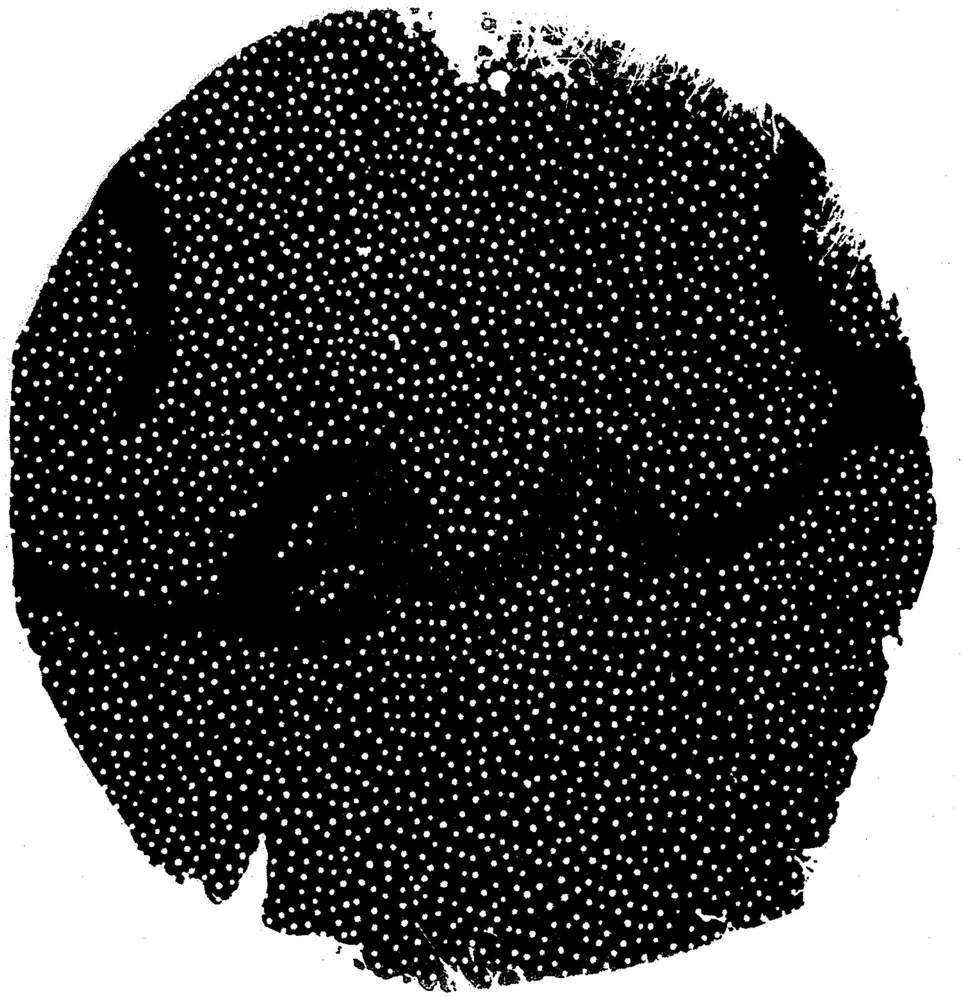
FIG. 7 is a reproduction of an enlarged portion of FIG. 6.

When the pattern of FIG. 5 is viewed through the above mentioned second encoding or viewing screen having a fine bit pattern similar to but different from that shown in FIG. 2, the result will be as shown in FIG. 6, an enlarged portion of which is shown in FIG. 7 and corresponds to the region illustrated in FIGS. 8, 9 and 10.

An additional feature of the present invention is that when the pattern of FIG. 5 is viewed through the first encoding or viewing screen having the fine bit pattern shown in FIG. 2, the result will again be as indicated in FIG. 4. Thus, since the same information has been entered in the form of erasing areas from the background pattern as well as writing in bits for the information pattern, both forms are readily discernible depending upon the choice of encoding or viewing screens employed.

More importantly, however, inspection of FIG. 8 does not suggest any apparent method of discriminating betwen information bits and non-information bits since the areas within the large grains as well as therebetween contain a relatively even though random distribution of fine bits.

While the dimensions of the areas forming the large grains and the fine bits may be varied, the preferred width of the large grains should be of the order of magnitude of two to five times the width of the line of the signature to be encoded therein and the dimensions of the fine bits and the spacing therbetween should be of the order of one-tenth that of the grain dimensions. From the above description and from comparisons of FIGS. 7 and 8, it will appear that the purpose of the large grains, then, is to provide for concealment of the information pattern while the purpose of the fine bits of the background pattern is to provide concealment for the individual information bits which go to make up the information pattern. That is to say, the signature is made up of the individual information bits concealed among the non-information bits of the background pattern while the overall signature itself is concealed in the gross structure of the background pattern.

It will be appreciated that, when the information pattern is both written into and erased from the background pattern in the manner described above, there will be no need to employ the gross structure of grains as part of the background pattern, since the overall background pattern of fine bits will have relatively even density even in the areas representing the encoded information. In such a case the composite pattern of information and non-information bits will appear to be very similar to the pattern of the encoding screen such as shown in FIG. 2.

Since the pattern of FIG. 5 was achieved by the employment of two different encoding screens having different patterns of similar random distributions of fine bits there is the possiblity of overlap between the individual bits of the two patterns. Since for a given code screen, the area represented by all the individual bits in about ten percent of the total area of the code screen, and this ratio holds for each of the two code screens, the total area of overlap should then be one percent of the total area of the code screen. For most commercial applications, this overlap should present no problem either in respect to detectability of the code screen pattern nor to the clarity of the image upon readout through an appropriate viewing screen. However, in those areas where such overlap is not desired, this problem may be eliminated by providing a supplemental pattern formed only of those areas of overlap which pattern will then be used with each code screen so that only the areas of non-overlap will be employed to either write or erase the respective encoding patterns into or from the background pattern.

Figure 11:
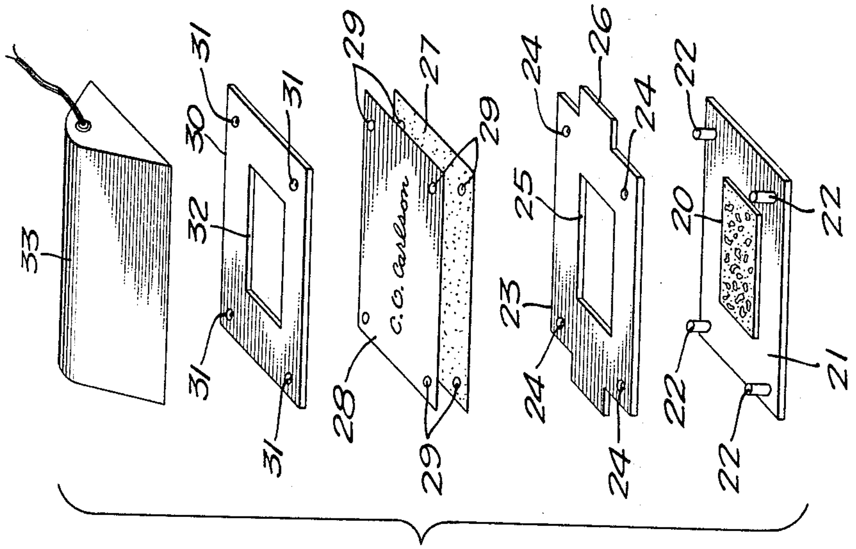
FIG. 11 is a pictorial view of apparatus for creating the respective patterns of the present invention, the components of the apparatus being disengaged for purposes of illustration.

While the foregoing description of the respective patterns employed in the present invention also illustrate the various steps in the method of creating the respective patterns and the end result thereof, a better understanding of the methods of the present invention will perhaps be achieved from a description of the apparatus for forming the respective patterns. A typical apparatus is shown in FIG. 11 of the drawings.

As stated in regard to the description of the respective patterns of the present invention, such patterns may be formed by standard photographic techniques which become quite complex; however, the preferred embodiment of the method employed in the present invention involves the use of a photo-metachromatic or phototropic material formed of a distribution of light sensitive dyes which become opaque in response to excitation by light of specific frequencies within the electromagnetic spectrum, which condition may be reversed on exposure to light of different frequencies within this spectrum. While the particular frequencies to be employed depend on the particular type of photo-metachromatic material, the material contemplated in the present invention is formed of elementary and complex spiropyrans and derivatives thereof and is of such a nature as to be changed to an opaque state in response to light of frequencies in the blue-ultraviolet portion of the electromagnetic spectrum which condition can be reversed upon resposure to white light and more particularly to light in the red-green portion of the electromagnetic spectrum. As a typical specific example of metachromatic material, a film may be formed by solidification of a poured mixture of the following, the proportions being in terms of parts by weight:

| | |
|---|---|
| Eastman "Half-second Butyrate" #EAB-381 | 25.0 |
| Chlorinated diphenyl having 60% by weight of 6′-nitro-8′-methoxy - 1,3,3-trimethylindolinobenzo-chlorine | 25.0 |
| Toluene | 28.0 |
| Methyl ethyl ketone | 22.0 |
| Ethanol (95%) | 5.4 |
| Butanol | 0.6 |
| pyrylospiran | 0.375 |

Further information on the "Half-second Butyrate" may be obtained from a publication bearing this title and copyrighted in 1955 by the Tennessee Eastman Company. This film may be mounted between thin quartz-glass sheets to form a "silde," or such a slide may be in the form of a transparent plastic coating on a suitable transparent substrate.

Referring now to FIG. 11 there is disclosed a film 20 of such a photo-metachromatic material that has been removably secured, as by adhesive, to a base plate 21 to which are secured a plurality of upright pins 22 for registration purposes to be more thoroughly described. Interim plate 23 is adapted to rest on base plate 21 and is provided with a plurality of registration holes 24 which are formed and spaced so as to engage registration pins 22 of base plate 21. Interim plate 23 is also provided with opening 25 so as to receive metachromatic plate 20 when interim plate 23 is in registered engagement with base plate 21. Interim plate 23 is also provided with a pair of handles 26 the purpose of which will be more fully described. Transparency 27 which is an encoding screen such as illustrated in FIG. 2, and transparency 28 which contains the signature to be encoded are each provided with a plurality of registration holes 29 which in turn are formed and spaced to receive registration pins 22 when the respective transparencies are positioned over intreim plate 23. To secure the assembly, top plate 30 is provided with registration holes 31 which are formed and spaced to receive registration pins 22 of base plate 21. Top plate 30 is also provided with port 32 so formed that metachromatic plate 20 can be exposed through transparencies 27 and 28 to light from light source 33 when the assembled apparatus is appropriately positioned in relation thereto.

Light source 33 may be any conventional light source provided with two or more lighting elements to respectively produce ultraviolet light and white or green light.

Various methods may be employed to form the random distributions of the background and encoding patterns. For example, the fine bit pattern of FIG. 2 may be formed by a dispersion of fine sand or confetti randomly distributed over a photographic film which film is then exposed and developed. The background pattern may be formed in a similar manner by distributing coarse grains over a film, and exposing the film. The resultant pattern then may be transferred to a metachromatic film and a fine bit pattern is then written into and erased from the light and dark areas, respectively, of the coarse pattern.

As illustrated in FIG. 11, a background pattern such as shown in FIG. 1 has already been formed on metachromatic plate 20 by contact printing of this pattern from an appropriate transparency with the use of ultraviolet light. Next, transparency 27 having a pattern such as shown in FIG. 2 is placed over metachromatic plate 20 and held in registration by registration pins 22 which engage registration holes 29 of the transparency 27, transparency 27 being supported by interim plate 23. The encoding pattern on transparency 27 is then erased from the background pattern of metachromatic plate 20 by exposure thereof to white or green light from light source 33. Transparency 28, containing the signature or other information to be encoded, is then placed over the encoding pattern of transparency 27 which is still in registration with metachromatic plate 20 and the entire assembly is exposed to ultraviolet light from light source 33 to write the encoding pattern of transparency 27 back into the background pattern of metachromatic plate 20 except in those areas covered by the signature of other information on transparency 28. The respective transparencies may then be removed by removing interim plate 23 and handles 26 on plate 23 have been provided for this purpose. The final pattern on metachromatic plate 20 will now be such as illustrated in FIG. 3 and metachromatic plate 20 can now be removed from base plate 21 so that the resultant pattern can be contact printed onto standard high resolution photographic film.

As explained in regard to the various patterns of FIGS. 1 through 6, the above steps may be varied. That is to say, the encoding pattern of transparency 27 may be written into the background pattern on metachromatic plate 20 upon exposure to ultraviolet light and the signature on transparency 28 is then placed over the encoding pattern and the assembly exposed to white light to erase the encoding pattern from the background pattern except in those areas to be covered by the signature.

When it is desired to produce an encoded information pattern in which the information has both been added to and subtracted from the background pattern, for the purposes described above, the above steps are combined in an appropriate order. For example, the background pattern of FIG. 1 is first written into metachromtic plate 20 by use of ultraviolet light. The encoding pattern of FIG. 2 is then erased from metachromatic plate 20 with the use of white or green light. The information pattern is placed over the encoding pattern which is still in registration with metachromatic plate 20 and the encoding pattern is then written back into metachromatic plate 20 except in those areas which are covered by the signature to be encoded. The first encoding pattern transparency, and the information transparency are then removed and a second encoding pattern different from but similar to the pattern of FIG. 2 is placed over metachromatic plate 20 and written into metachromatic plate 20 with the use of ultraviolet light. The signature transparency is then placed over the second encoding pattern which is still in registration with metachromatic plate 20, the signature pattern having the same registration as before and the second encoding pattern is erased (by white light) from metachromatic plate 20 except in those areas covered by the signature pattern. The respective apparatus is then disassembled and the resultant pattern in metachromatic plate 20 is contact printed onto standard high resolution photographic film and will appear as shown in FIG. 5.

Figure 12:
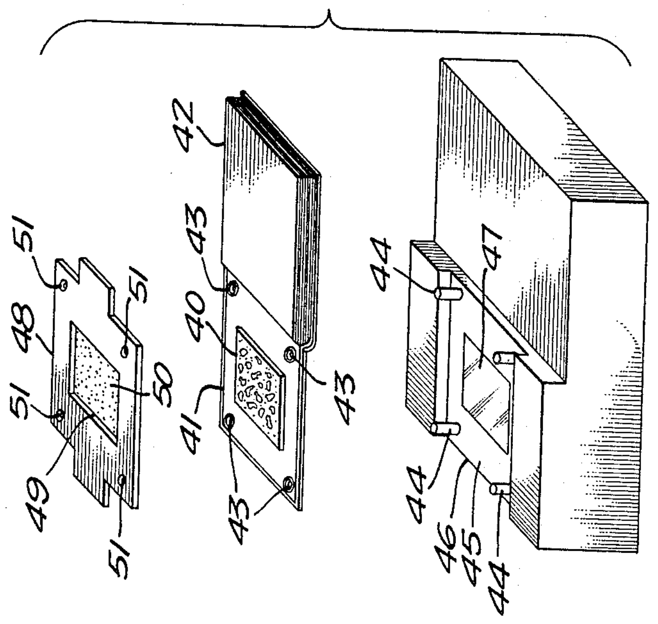
FIG. 12 is a pictorial view of a typical reading device for employment with the present invention.

After the encoded information pattern has been created and transferred to standard photographic film, the film may then be mounted in a conventional passbook or account book, and the like, in such a manner that light may be passed through the film for conventional readout with a typical readout device such as shown in FIG. 12.

As shown in FIG. 12, photographic film 40 is mounted on the inside of cover 41 of account book 42, cover 41 being provided with an opening (not shown) below film 40 for the purposes of permitting light to be passed therethrough. Cover 41 is also provided with a plurality of registration holes 43 which are so formed and spaced as to receive registration pins 44 mounted on the top surface 45 of illumination chamber 46.

Decoding plate 48 is provided with viewing port 49 across which is secured a transparent decoding film 50 that contains a pattern in the form of a photographic copy of the encoding pattern originally used to encode the information in the encoded pattern on film 40. If the pattern of film 40 is such as to have been formed by two encoding patterns, in accordance with the method described above, either encoding pattern may be employed as the pattern on transparent film 50. Film 50 is so secured to decoding plate 48 as to be in proper alignment relative to registration holes 51 that are formed and spaced to receive registration pins 44 of illumination chamber 46.

When the account book cover and the decoding plate are placed over the illumination chamber in the order illustrated in FIG. 12, the decoding pattern of film 50 will be in proper registration with the encoded pattern of film 40 for the viewing of the information contained therein when light from illumination port 47 of illumination chamber 46 is passed therethrough. Thus, a teller or clerk, for example, upon receiving the account book from the respective customer can quickly register the encoded information pattern with the decoding pattern and readout the signature encoded therein for comparison with the signature of the customer as presented on an account slip or the like.

Illumination chamber 46 can be of such a size as to be easily placed on the counter at which the respective clerk is engaged or it may be conveniently incorporated with various types of business machines used by the clerk depending upon the particular business in which the clerk is engaged. If desired, the apparatus for encoding the information such as shown in FIG. 11 may also be conveniently incorporated in the signature reader of FIG. 12, and it will be understood that various devices may be designed and fabricated for the purposes of creating the composite pattern and for the decoding of such a pattern without the departing from the scope of the present invention.

From the foregoing description of the method of forming a composite encoded information pattern, it will be understood that various types of information can be encoded in a given background pattern by employing different encoding patterns for each type of information. When such a composite encoded pattern is employed with an account book and the like, the account book can be submitted to different agencies or departments each of which is provided with an appropriate decoding pattern to readout the particular information of importance to that particular agency or department. It will be further understood that the methods and devices disclosed herein may be used to encode various forms of information irrespective of whether that information is in the form of a single signature, an entire written document, various photographs or other graphical patterns and that the randomly distributed fine structure of the above described background patterns and encoding patterns can be chosen to be of sufficiently small dimensions as to accommodate the finest detail of the information to be encoded. Furthermore, the background pattern can be any pattern not related to the information to be encoded. For example, if the encoding device is to be used for savings account passbooks, the background pattern could be a picture of the particular bank and so on.

Although the above disclosure does not specifically describe how one may obtain a completely radom distribution either for the fine bits or the coarse grains, it will be understood that the features of the present invention do not depend upon the exact structure of the encoding and background patterns and any method of insuring complete randomness of the respective distributions may be employed within the scope of the present invention. While the essence of the encoding device is the randomness of the pattern distribution, it will be appreciated that the method can be employed with any encoding pattern, random or otherwise, having a relatively uniform density such as might be formed by a fine screen mesh and the like.

Exemplary embodiments of the apparatus and method utilizing the principles of the present invention having been disclosed, it will be evident that changes and modifications will occur to those skilled in the art, and accordingly it is not desired to be limited to the respective exemplary apparatus and procedures herein described.

What is claimed is:

1. A method of graphically encoding information having a definite pattern, said method comprising: forming on a supporting member a background pattern having first and second irregular areas distributed therethroughout, said first areas being larger in size than said second areas; forming a first encoding pattern having irregular areas distributed therethroughout; removing the areas of said first encoding pattern from said background pattern; superimposing the areas of said first encoding pattern on said altered background pattern except in those definite areas representing the definite pattern of said information; forming a second encoding pattern having irregular areas distributed therethroughout; superimposing the areas of said second encoding pattern on said background pattern; and removing the areas of said second encoding pattern from said altered background pattern except in those definite areas representing the definite pattern of said information; said second encoding pattern being similar to but different from said first encoding pattern.

2. A method of graphically encoding information having a definite pattern, said method comprising: forming on a supporting member a background pattern having first and second irregular areas distributed therethroughout, said first areas being larger in size than said second areas; forming an encoding pattern having irregular areas distributed therethroughout; superimposing the areas of said encoding pattern over said background pattern; and removing the areas of said encoding pattern from said altered background pattern except in those definite areas representing the definite pattern of said information.

3. A method of encoding information having a definite pattern, said method comprising: forming on a supporting member a background pattern of randomly distributed regions; forming a first encoding pattern of randomly distributed regions; superimposing said first encoding pattern on said background pattern; removing the regions of said first encoding pattern from said altered background pattern except in those definite regions representing the definite pattern of said information; forming a second encoding pattern of randomly distributed regions; removing the regions of said second encoding pattern from said background pattern; and superimposing regions of said second encoding pattern over said background pattern in those definite regions representing the definite pattern of said information.

4. A method of encoding information having a definite pattern, said method comprising: forming on a supporting member a background pattern of randomly distributed regions; forming an encoding pattern of randomly distributed regions; removing the regions of said encoding pattern from said background pattern; and superimposing the regions of said encoding pattern over said altered background pattern except in those definite regions representing the definite pattern of said information.

5. A method of graphically encoding information having a definite pattern, said method comprising: forming on a supporting member a background pattern; forming a first encoding pattern within said background pattern; erasing the areas of said first encoding pattern from said altered background pattern except in those definite areas representing the definite pattern of said information; forming a second encoding pattern; erasing from the background pattern the areas of said second encoding pattern; and superimposing of the areas of said second encoding pattern on said altered background pattern except in those definite areas representing the definite pattern of said information.

6. A method of graphically encoding information having a definite pattern, said method comprising: forming on a supporting member a background pattern having a random distribution or irregular areas; forming an encoding pattern having a random distribution of areas within said background pattern; and erasing the areas of said encoding pattern from said background pattern except in those defininte areas representing the definite pattern of said information.

7. A method of graphically encoding information having a definite pattern, said method comprising: forming on a supporting member a background pattern; forming an encoding pattern; erasing the areas of said encoding pattern from said background pattern; and superimposing the areas of said encoding pattern over said altered background pattern except in those definite areas representing the definite pattern of said information.

8. A method of graphically encoding information having a definite pattern, said method comprising: providing a plate of photo-metachromatic material which becomes opaque in response to radiation by first frequencies within the electromagnetic spectrum, and which opaqueness can be erased by exposure to radiation by second frequencies within the spectrum; forming a background pattern on said plate using radiation of said first frequencies; erasing from the background pattern on said plate an encoding pattern using radiation of said second frequencies; and writing said encoding pattern back onto said plate except in those areas representing the definite pattern of said information using radiation of said first frequencies.

9. A method of encoding information comprising: providing a plate of photo-metachromatic material which becomes opaque in response to radiation by first frequencies within the electromagnetic spectrum, and which opaqueness can be erased by exposure to radiation by second frequencies within the spectrum; forming a background pattern on said plate using radiation of said first frequencies; superimposing on said background pattern an encoding pattern using radiation of said first frequencies; and erasing said encoding pattern from said background pattern using radiation of said second frequencies except in locations coinciding with the information to be encoded.

10. A method of encoding information comprising: providing a plate of photo-metachromatic material which becomes opaque in response to radiation by first frequencies within the electromagnetic spectrum, and which opaqueness can be erased by exposure to radiation by second frequencies within the spectrum; forming a background pattern on said plate using radiation of said first frequencies; erasing from said background pattern in accordance with the information to be encoded using radiation of said second frequencies and a first encoding pattern; and adding to said background pattern in accordance with the information to be encoded using radiation of said first frequencies and a second encoding pattern; said first and second encoding patterns being chosen so that the overlay between the portions erased and added are sufficiently small so as to permit recovery of the encoded information.

References Cited by the Examiner

UNITED STATES PATENTS

| | | | |
|---|---|---|---|
| 2,377,292 | 5/1945 | Donaldson | 96—43 |
| 2,405,972 | 8/1946 | McCrum | 96—43 |
| 2,417,163 | 3/1947 | Horst | 35—2 |
| 2,624,958 | 1/1953 | Fine | 35—2 |
| 2,952,080 | 9/1960 | Avakian et al. | 35—2 |
| 2,953,454 | 9/1960 | Berman | 96—89 |
| 2,995,443 | 8/1961 | Kempe | 96—43 |

NORMAN G. TORCHIN, *Primary Examiner.*

LOUISE P. QUAST, ALEXANDER RICCI, A. L. LIBERMAN, R. H. SMITH, *Assistant Examiners.*

---

UNITED STATES PATENT OFFICE

CERTIFICATE OF CORRECTION

Patent No. 3,279,095 October 18, 1966

Carl O. Carlson

It is hereby certified that error appears in the above numbered patent requiring correction and that the said Letters Patent should read as corrected below.

Column 5, line 74, for "areas" read -- cases --; column 6, line 33, for "resposure" read -- exposure --; line 42, strike out "6′-nitro-8′-methoxy-1,3,3-trimethylindolinobenzo-"; line 48, before "pyrylospiran" insert -- 6′-nitro-8′-methoxy-1,3,3-trimethylindolinobenzo- --; line 54, for "silde" read -- "slide" --; column 9, line 18, for "radom" read -- random --; column 11, line 13, for "overlay" read -- overlap --.

Signed and sealed this 5th day of September 1967.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,279,095 October 18, 1966

Carl O. Carlson

It is hereby certified that error appears in the above numbered patent requiring correction and that the said Letters Patent should read as corrected below.

Column 5, line 74, for "areas" read -- cases --; column 6, line 33, for "resposure" read -- exposure --; line 42, strike out "6′-nitro-8′-methoxy-1,3,3-trimethylindolinobenzo-"; line 48, before "pyrylospiran" insert -- 6′-nitro-8′-methoxy-1,3,3-trimethylindolinobenzo- --; line 54, for "silde" read -- "slide" --; column 9, line 18, for "radom" read -- random --; column 11, line 13, for "overlay" read -- overlap --.

Signed and sealed this 5th day of September 1967.

(SEAL)
Attest:

ERNEST W. SWIDER
Attesting Officer

EDWARD J. BRENNER
Commissioner of Patents